United States Patent
Mahnke

(10) Patent No.: US 8,549,065 B2
(45) Date of Patent: Oct. 1, 2013

(54) METHOD AND DEVICE FOR CLIENT/SERVER COMMUNICATION ACCORDING TO THE STANDARD PROTOCOL OPC UA

(75) Inventor: Wolfgang Mahnke, Hettelleidelheim (DE)

(73) Assignee: ABB Research Ltd, Zurich (CH)

( * ) Notice: Subject to any disclaimer, the term of this patent is extended or adjusted under 35 U.S.C. 154(b) by 429 days.

(21) Appl. No.: 12/819,601

(22) Filed: Jun. 21, 2010

(65) Prior Publication Data
US 2010/0306313 A1    Dec. 2, 2010

Related U.S. Application Data

(63) Continuation of application No. PCT/EP2008/010683, filed on Dec. 16, 2008.

(30) Foreign Application Priority Data

Dec. 21, 2007 (DE) .................... 10 2007 062 986

(51) Int. Cl.
*G06F 15/16* (2006.01)
(52) U.S. Cl.
USPC ...................................................... 709/203
(58) Field of Classification Search
USPC .............. 709/201, 202, 208, 212, 216, 217, 709/220, 223, 203
See application file for complete search history.

(56) References Cited

U.S. PATENT DOCUMENTS

| | | | | |
|---|---|---|---|---|
| 5,946,663 A * | 8/1999 | Tanaka et al. | ............... | 705/7.25 |
| 6,415,196 B1 * | 7/2002 | Crampton et al. | ............ | 700/100 |
| 6,591,153 B2 * | 7/2003 | Crampton et al. | ............ | 700/103 |
| 6,832,238 B1 * | 12/2004 | Sharma et al. | ............... | 709/201 |
| 7,020,697 B1 * | 3/2006 | Goodman et al. | ........... | 709/223 |
| 7,467,198 B2 * | 12/2008 | Goodman et al. | ........... | 709/223 |
| 7,835,952 B2 * | 11/2010 | Tozawa et al. | ................. | 705/28 |
| 8,219,669 B2 * | 7/2012 | Agrusa et al. | ................ | 709/224 |
| 8,321,806 B2 * | 11/2012 | Agrusa et al. | ................ | 715/772 |
| 2002/0107600 A1 * | 8/2002 | Crampton et al. | ............ | 700/100 |
| 2003/0033486 A1 * | 2/2003 | Mizrachi et al. | ............. | 711/133 |
| 2003/0200150 A1 * | 10/2003 | Westcott et al. | ................ | 705/26 |
| 2003/0208389 A1 * | 11/2003 | Kurihara et al. | ................ | 705/7 |
| 2007/0067725 A1 | 3/2007 | Cahill et al. | | |

(Continued)

FOREIGN PATENT DOCUMENTS

GB    2430499 A    3/2007

OTHER PUBLICATIONS

International Search Report for PCT/EP2008/010683 completed May 5, 2009.

(Continued)

*Primary Examiner* — Sargon Nano
(74) *Attorney, Agent, or Firm* — Buchanan Ingersoll & Rooney PC

(57) ABSTRACT

A method and a corresponding device are disclosed for communicating between clients and servers of a client/server system using the standard protocol OPC UA, and for the interaction of an OPC UA client with an OPC UA server, OPC UA service calls are used. In order to integrate a transaction context in OPC UA service calls, all OPC UA servers of the system are complemented by a transaction management component, and in order to carry out transactions, appropriately configured OPC UA clients communicate with respective OPC UA servers using transactions.

16 Claims, 4 Drawing Sheets

(56) References Cited

U.S. PATENT DOCUMENTS

| | | | |
|---|---|---|---|
| 2007/0078696 A1* | 4/2007 | Hardin, Jr. | 705/8 |
| 2008/0114872 A1* | 5/2008 | Fisher et al. | 709/224 |
| 2009/0199112 A1* | 8/2009 | DeSerranno | 715/760 |
| 2009/0210071 A1* | 8/2009 | Agrusa et al. | 700/9 |
| 2009/0210814 A1* | 8/2009 | Agrusa et al. | 715/772 |

OTHER PUBLICATIONS

Allen Bradley, Product Profile FactoryTalk Transaction Manager, Rockwell Automation, Jun. 2007, pp. 1-4.

* cited by examiner

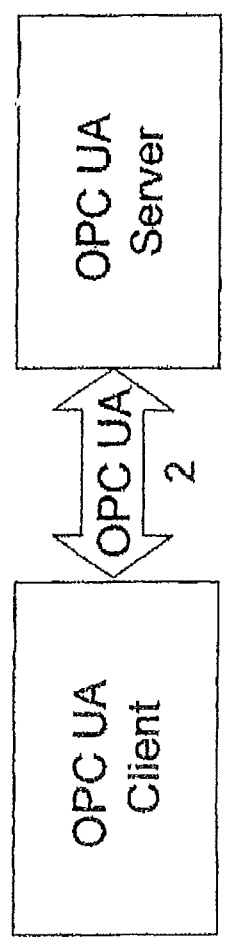
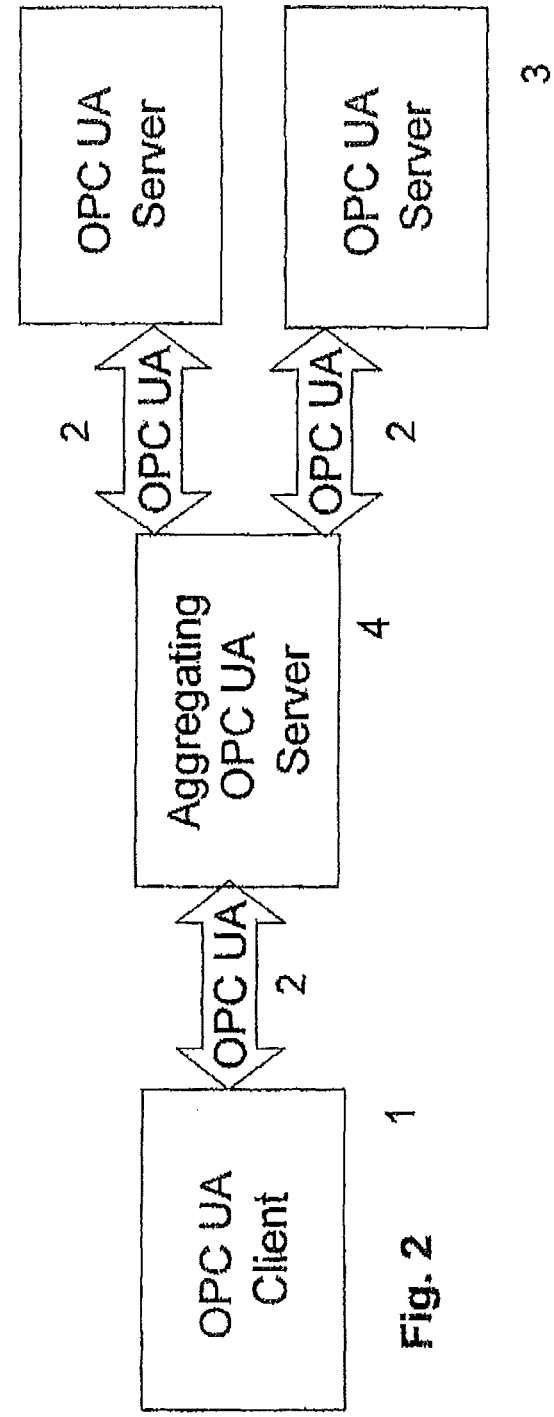

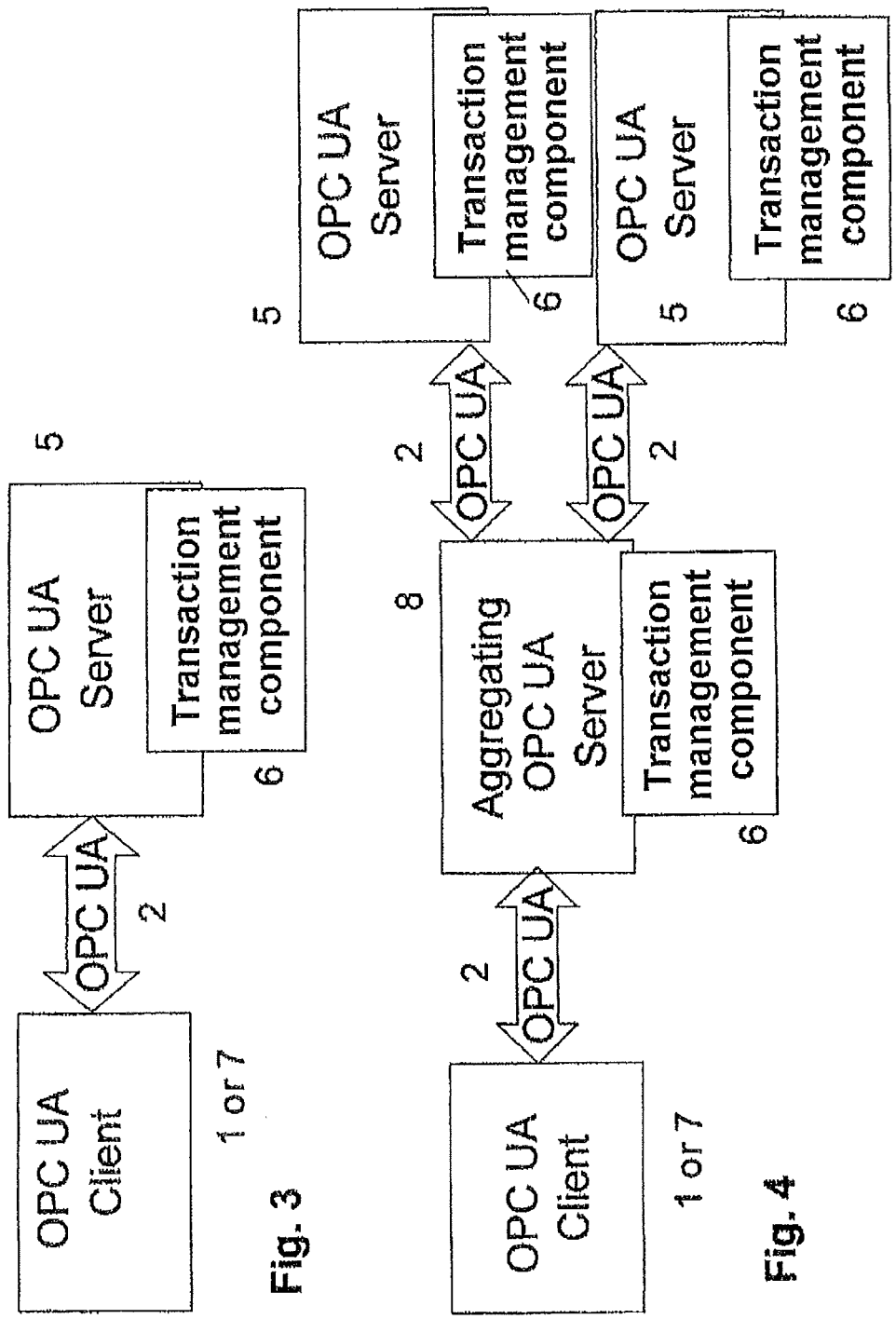

US 8,549,065 B2

METHOD AND DEVICE FOR CLIENT/SERVER COMMUNICATION ACCORDING TO THE STANDARD PROTOCOL OPC UA

RELATED APPLICATIONS

This application claims priority as a continuation application under 35 U.S.C. §120 to PCT/EP2008/010683, which was filed as an International Application on Dec. 16, 2008 designating the U.S., and which claims priority to German Application 10 2007 062 986.0 filed in Germany on Dec. 21, 2007. The entire contents of these applications are hereby incorporated by reference in their entireties.

FIELD

The disclosure relates to a method and a device for communication, such as communication between clients and servers according to a OPC UA protocol. The method and the device can be suitable for different applications, in particular for communication in automation systems.

BACKGROUND INFORMATION

OPC UA is a known standard protocol for manufacturer-independent communication, in particular in process automation, specified by the OPC Foundation. Although the original name for OPC was OLE for Process Control, OPC has been used without an indication of an abbreviation. UA stands for Unified Architecture.

FIG. 1 and FIG. 2 illustrate known arrangements for interaction according to the OPC UA specification. In this case, FIG. 1 shows an OPC UA client 1 which can interact with an OPC UA server 3 by OPC UA service calls using the OPC UA protocol and a communication system 2. However, an OPC UA server can also act as a client with respect to other servers and can compile the data from the latter and provide the data to clients in its address space. FIG. 2 illustrates such an arrangement. An OPC UA client 1 interacts with a server, which can be called the aggregating OPC UA server 4, which in turn can communicate with two OPC UA servers 3 via the communication system 2.

Client/server operation according to the OPC UA standard can be used in many fields, for example, in production management systems or in production planning, and generally in control engineering. Client and server functions can be implemented, for example, in devices and controllers. In such arrangements, OPC UA can make it possible not only to read and write data but also to change organizational structures for data. As a result, OPC UA clients are able to tackle both complex configuration tasks and engineering tasks or other tasks which write data and/or involve structural changes. Whether an OPC UA client has to make either all changes or no changes to a plurality of OPC UA service calls can depend on such tasks. This is relevant if a plurality of OPC UA clients simultaneously make changes to an OPC UA server. Database systems are known which use transactions. However, a transaction context has hitherto not been specified for OPC UA. The granularity of data manipulation actions can involve a plurality of OPC UA service calls but a transaction context has not been specified for an individual OPC UA service call. The case in which individual write operations are successful and others are not may even occur in the case of an individual OPC UA service call which involve, for example, writing to a plurality of values.

SUMMARY

A method is disclosed for communication between a client and a server in a client/server system using an OPC UA protocol, including: making an OPC UA service call for interaction between an OPC UA client and an OPC UA server; and carrying out communications between the OPC UA client and the OPC UA server via transactions integrated in OPC UA service calls in a transaction context using a transaction management component, such that OPC UA clients arranged to carry out transactions each communicate with an OPC UA server using transactions.

A device is disclosed for communication between clients and servers in a client/server system using an OPC UA protocol, wherein OPC UA service calls are used for interaction between an OPC UA client and an OPC UA server, the device including: a transaction management component for supplementing all OPC UA servers in the system in order to integrate a transaction context in OPC UA service calls; and OPC UA clients arranged to carry out transactions.

BRIEF DESCRIPTION OF THE DRAWINGS

A further explanation of the disclosure and its advantages is set forth in the following description of exemplary embodiments using the figures of the drawing, in which:

FIG. 1 shows a known arrangement containing an OPC UA client and an OPC UA server;

FIG. 2 shows a known OPC UA client/server arrangement with an inserted aggregating OPC UA server;

FIG. 3 shows an exemplary embodiment of an arrangement according to the disclosure containing an OPC UA client and an OPC UA server set up to carry out transactions;

FIG. 4 shows an exemplary embodiment of an arrangement according to the disclosure containing an OPC UA client, an aggregating OPC UA server set up to carry out transactions and OPC UA servers likewise set up for transactions;

DETAILED DESCRIPTION

Figure 5:
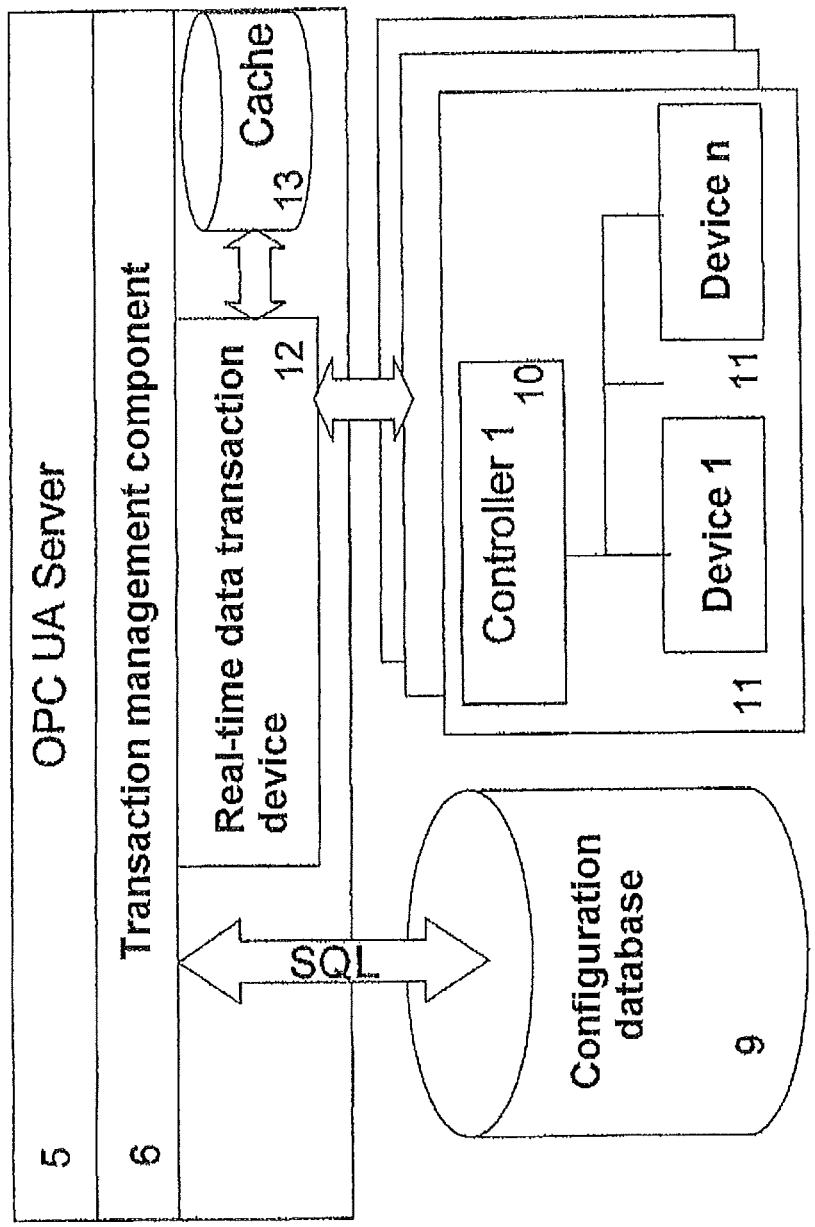
FIG. 5 shows an exemplary embodiment of an OPC UA server according to the disclosure.

The disclosure specifies an exemplary method and an exemplary device which make it possible to carry out transactions within the scope of OPC UA service calls.

This can be achieved by an exemplary method for communication between clients and servers using the OPC UA protocol.

In order to integrate a transaction context in OPC UA service calls, exemplary embodiments can supplement all OPC UA servers in the system by means of a transaction management component. As a result, OPC UA clients arranged to carry out transactions can communicate with an OPC UA server using transactions.

The exemplary arrangement according to FIG. 3 contains an OPC UA server 5 which can be arranged to carry out transactions by means of a transaction management component 6. In principle, any generic OPC UA client 1 can communicate with the OPC UA server 5 via the communication system 2. However, transactions can be carried out only using an OPC UA client 7 which is set up for transactions. Details of this are explained further below.

Like FIG. 2, FIG. 4 shows an exemplary arrangement containing an aggregating OPC UA server but, in FIG. 4, an aggregating OPC UA server 8 which contains a transaction management component 6 can be used. Like in the exemplary arrangement according to FIG. 3, transactions in the case of communication with an OPC UA client 7 set up for transactions can be supported. Thus, even OPC UA servers 5 which are each arranged to carry out transactions by means of a transaction management component 6 and support a two-phase commit protocol can communicate with the aggregating OPC UA server 8.

FIG. 5 shows, by way of example, how an exemplary transaction management component 6 can be implemented in an OPC UA server 5. The OPC UA server 5 can receive its data from a configuration database 9 using the structured query language SQL and also receives real-time data from controllers 10 and devices 11 connected thereto. The configuration database 9 can be set up to support transactions, with the result that the OPC UA server 5 can forward transactions to the configuration database 9. In an exemplary embodiment, the controllers 10 and devices 11 do not support transactions, which is why the transaction management component 6 can take this into account using a real-time data transaction device 12. On the basis of internal knowledge, the component can check whether particular desired changes are permissible and can delay the operation of making the changes until the respective OPC UA client 7 confirms the transaction. In conjunction with a cache memory 13 and using caching mechanisms, the OPC UA server 5 can store potentially changed data in order to provide the OPC UA client 7 with a correct representation of the data in the transaction context. If it is desired for the OPC UA server 5 to change data in a device 11 without a delay, it can use compensation mechanisms in order to change the data outside a transaction if an OPC UA client 7 aborts a transaction.

If an OPC UA client 7 or typically an OPC UA client 1 is not accessed in a transaction context, the OPC UA server 5 bypasses the transaction management component 6 and directly accesses the configuration database 9 or data from controllers 10 or devices 11.

Figure 6:
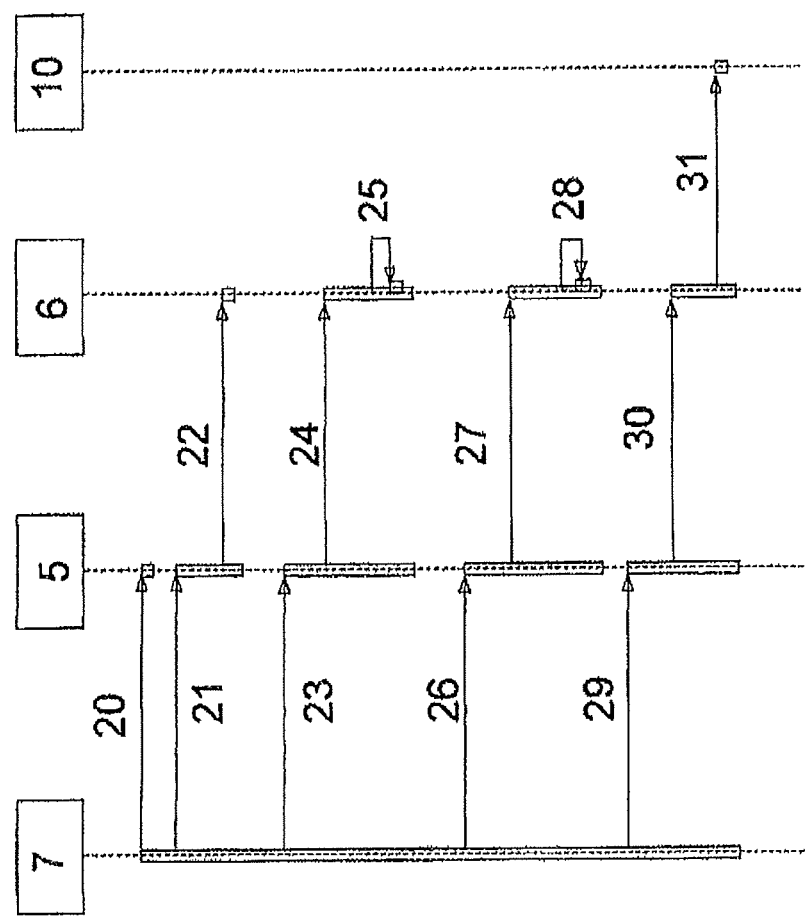
FIG. 6 shows a flowchart of an exemplary transaction.

Method characteristics and an exemplary sequence are described below using an exemplary flowchart which is illustrated in FIG. 6. FIG. 6 illustrates four exemplary components which can be involved in a transaction, namely an OPC UA client 7, an OPC UA server 5, a transaction management component 6 and a supplier of real-time data, for example a controller 10. Before explaining the sequence steps illustrated, characteristics of the disclosed use of transactions are first described.

The address space of an OPC UA server 5 which has been set up to carry out transactions contains additional OPC UA methods which can be called in order to start, conclude or abort a transaction. The method parameters can differ depending on the selected type of transaction, in which case, for example, different isolation levels or interleaved transactions can be supported.

An OPC UA client 7 which would like to carry out an OPC UA service call in a transaction context calls a method for starting a transaction. Within the scope of a session of an OPC UA client 7, which exists as an OPC UA session, this can change the OPC UA server 5 to a transaction context. Each OPC UA service request from the OPC UA client 7 with regard to data access and data manipulation within the scope of the OPC UA session can then be effected by the OPC UA server 5 in the transaction context.

Depending on locking mechanisms implemented in the OPC UA server 5, the OPC UA client 7 can receive notification of special status codes for OPC UA service requests if actions fail on account of locking restrictions or timeouts. OPC UA clients which do not use transactions can also receive such status codes because particular values may be blocked.

An OPC UA client 7 can also receive notification of status codes which identify those parts of an OPC UA service request which resulted in the error message. If, for example, five values were intended to be written, it can be reported that the operation of writing the second and fourth values failed.

If an OPC UA client 7 would like to abort a transaction, it calls a method for aborting the transaction. In this case, all changes which have already been made to the system are withdrawn. For example, the OPC UA server 5 can be reset to the status before the changes. However, depending on the locking mechanism selected, OPC UA clients can be affected if they accessed data during the change.

In order to confirm a transaction if necessary, an OPC UA client 7 can call a method for confirming a transaction. In this case, the OPC UA server 5 attempts to make all changes persistent. If the changes cannot be permanently accepted, the OPC UA server 5 can abort the transaction and return the confirmation method together with a corresponding status code. If all desired changes can become persistent, the OPC UA server 5 reports back a corresponding result.

If an OPC UA client 7 would like to call some OPC UA service requests without a transaction context and other service requests with a transaction context, it can set up a plurality of OPC UA sessions.

According to one exemplary embodiment, the OPC UA server 5 can support interleaved transactions. In this case, the OPC UA client 7 may call a method for the repeated starting of a transaction and can abort an interleaved transaction as a whole using one operation. Without such support for interleaved transactions, an OPC UA client 7 would receive an error message if it were to request a method for starting a transaction a second time before it has aborted or confirmed the first transaction.

According to another exemplary embodiment, the address space of the OPC UA server 5 can contain information relating to supported authorization levels (isolation levels), and methods for carrying out transactions can use the selected authorization level as an input parameter. However, if the OPC UA server 5 supports only one authorization level, this refinement is optional.

The flowchart illustrated in FIG. 6 relates to exemplary interactions (as described above) between an OPC UA client 7 and an OPC UA server 5 for carrying out data manipulation measures in a transaction context. In this case, responses from the server to the client are not shown in order to simplify the illustration. In a first step 20, an OPC UA session can be set up. In a second step 21, the OPC UA client 7 can call a method for starting a transaction. In a third step 22, the transaction management component 6 can receive specified information, for example information relating to the start of the transaction and the calling client. In a fourth step 23, the OPC UA client 7 can specify manipulation of first data. In a fifth step 24, this request can be forwarded from the OPC UA client 7 to the transaction management component 6 in which the permissibility of the specified change can be checked in a sixth step 25. In the example illustrated, the OPC UA client 7 can specify manipulation of second data in a seventh step 26 within the existing transaction, which specification can be forwarded in an eighth step 27 to the transaction management component 6 and can be checked there in a ninth step 28. In order to conclude the transaction, the OPC UA client 7 can call a method for confirming the transaction in a tenth step 29. In an eleventh step 30, the confirmation instruction can be forwarded to the transaction management component 6 which finally can induce the desired manipulation of the first and second data in the controller 10 in a twelfth step 31.

As an alternative solution to the exemplary method described above, additional services which are used in the context of OPC UA sessions in order to set up, abort or conclude transactions can be defined. However, corresponding additional services can be added to the OPC UA service framework for this purpose and functions desired both in clients and in servers would have to be implemented.

Another exemplary embodiment which is, however, less flexible in the use of transactions can involve defining generic methods with all specified changes in a transaction. Such a method can contain, as the input, an array of values to be written as well as arrays of nodes, for example, as part of the address space structure in OPC UA or, for example, erase operations.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for communication between a client and a server in a client/server system using an OPC UA protocol, comprising:
    making a OPC UA service call for interaction between an OPC UA client and an OPC UA server; and
    carrying out communications between the OPC UA client and the OPC UA server via transactions integrated in OPC UA service calls in a transaction context using a transaction management component, such that OPC UA clients arranged to carry out transactions each communicate with an OPC UA server using transactions wherein for communication between an OPC UA client and an OPC UA server using transactions:
    configuring an OPC UA session;
    calling a method for starting a transaction by the OPC UA client;
    receiving, at the transaction management component of the OPC UA server, information relating to the start of a transaction;
    manipulating data at the OPC UA client and checking the permissibility of the manipulation by the transaction management component; and
    calling, in order to conclude the transaction, via the OPC UA client, a method for confirming the transaction and, after corresponding checking by the transaction management component, inducing the manipulation of data in an addressed device.

2. The method as claimed in claim 1, comprising:
    supplementing the OPC UA server with a transaction management component;
    and carrying out transactions both with OPC UA clients arranged to carry out transactions and, in a client function, with the OPC UA server.

3. The method as claimed in claim 2, comprising:
    configuring the OPC UA servers to also communicate with OPC UA clients, which are not arranged to carry out transactions, without using transactions.

4. The method as claimed in claim 1, comprising:
    configuring the OPC UA server to also communicate with OPC UA clients, which are not arranged to carry out transactions, without using transactions.

5. A device for communication between clients and servers in a client/server system using an OPC UA protocol, wherein OPC UA service calls are used for interaction between an OPC UA client and an OPC UA server, the device comprising:
    a transaction management component for supplementing all OPC UA servers in the system in order to integrate a transaction context in OPC UA service calls; and OPC UA clients arranged to carry out transactions, wherein for communicating between the OPC UA client and the OPC UA server using transactions, the device is configured to configure an OPC UA session;
    call a method for starting a transaction by the OPC UA client;
    receive, at the transaction management component of the OPC UA server, information relating to the start of a transaction;
    manipulate data at the OPC UA client and checking the permissibility of the manipulation by the transaction management component; and
    call, in order to conclude the transaction, via the OPC UA client, a method for
    confirming the transaction and, after corresponding checking by the transaction management component, inducing the manipulation of data in an addressed device.

6. The device as claimed in claim 5, wherein the device is configured to:
    aggregate OPC UA servers in the system which are each supplemented with a transaction management component for carrying out transactions both with OPC UA clients arranged to carry out transactions and, in a client function, with OPC UA servers.

7. The device as claimed in claim 6, wherein the OPC UA server with an implemented transaction management component is configured to accept required configuration data from a configuration database and also
    real-time data from controllers and devices connected thereto or other data sources and to manipulate data there, and the configuration database is set up to support transactions.

8. The device as claimed in one of claim 6, wherein the OPC UA server is configured to support interleaved transactions.

9. The device as claimed in claim 5, wherein the OPC UA server with an implemented transaction management component is configured to accept required configuration data from a configuration database and also real-time data from controllers and devices connected thereto or other data sources and to manipulate data there, and the configuration database is set up to support transactions.

10. The device as claimed in claim 9, wherein the OPC UA server is configured to use a real-time data transaction device to check whether requested changes are permissible and to delay the operation of making the changes until a respective OPC UA client confirms the transaction.

11. The device as claimed in claim 10, wherein the OPC UA server is configured to use a cache memory and caching mechanisms to store potentially changed data in order to provide the OPC UA client with a correct representation of the data in the transaction context.

12. The device as claimed in one of claim 10, wherein the OPC UA server is configured to support interleaved transactions.

13. The device as claimed in claim 9, wherein the OPC UA server is configured to use a cache memory and caching mechanisms to store potentially changed data in order to provide the OPC UA client with a correct representation of the data in the transaction context.

14. The device as claimed in one of claim 13, wherein the OPC UA server configured to support interleaved transactions.

15. The device as claimed in one of claim 9, wherein the OPC UA server is configured to support interleaved transactions.

16. The device as claimed in one of claim 5, wherein the OPC UA server is configured to support interleaved transactions.

* * * * *